US006662413B2

(12) United States Patent
Glover

(10) Patent No.: US 6,662,413 B2
(45) Date of Patent: Dec. 16, 2003

(54) HARNESS RETAINER WITH LIMITED-TRAVEL BUTTON

(75) Inventor: Richard Glover, Greenwood, IN (US)

(73) Assignee: Cosco Management, Inc., Wilmington, DE (US)

( * ) Notice: Subject to any disclaimer, the term of this patent is extended or adjusted under 35 U.S.C. 154(b) by 0 days.

(21) Appl. No.: 10/137,038

(22) Filed: May 2, 2002

(65) Prior Publication Data

US 2003/0204940 A1 Nov. 6, 2003

(51) Int. Cl.[7] ............................................... A44B 11/25
(52) U.S. Cl. ....................... 24/615; 24/636; 24/652; 24/614; 24/625; 297/468; 297/484
(58) Field of Search .................. 24/615, 633, 629, 24/642, 636, 652, 656, 664, 326, 455, 614, 616, 625, 193, 662

(56) References Cited

U.S. PATENT DOCUMENTS

| 1,527,111 | A | | 2/1925 | Bauman | |
|---|---|---|---|---|---|
| 3,200,464 | A | * | 8/1965 | Cousins | 24/593.1 |
| 3,392,426 | A | | 7/1968 | Mathison et al. | |
| 4,035,877 | A | * | 7/1977 | Brownson et al. | 264/103 |
| 4,762,369 | A | | 8/1988 | Nicod | |
| 4,813,108 | A | * | 3/1989 | Geldwerth | 24/616 |
| 4,928,364 | A | * | 5/1990 | Ikeda | 24/614 |
| 5,005,267 | A | * | 4/1991 | Sugimoto | 24/637 |
| 5,084,946 | A | | 2/1992 | Lee | |
| D328,239 | S | | 7/1992 | Meeker | |
| 5,263,234 | A | * | 11/1993 | Fudaki | 24/662 |
| 5,398,390 | A | * | 3/1995 | Hede et al. | 24/616 |
| 5,427,562 | A | * | 6/1995 | Hwang | 450/58 |
| 5,440,792 | A | * | 8/1995 | Ida | 24/615 |
| 5,471,716 | A | * | 12/1995 | Takahashi | 24/615 |
| 5,537,725 | A | * | 7/1996 | Takahashi | 24/615 |
| 5,683,138 | A | | 11/1997 | Ward, Jr. et al. | |
| 5,791,026 | A | * | 8/1998 | Anscher | 24/615 |
| 5,873,635 | A | * | 2/1999 | Merrick | 297/484 |

FOREIGN PATENT DOCUMENTS

| CH | 101015 | 9/1923 |
|---|---|---|
| DE | 2926 839 | 1/1981 |
| FR | 609.979 | 8/1926 |
| GB | 3142 | of 1889 |

* cited by examiner

Primary Examiner—Anthony Knight
Assistant Examiner—André L. Jackson
(74) Attorney, Agent, or Firm—Barnes & Thornburg

(57) ABSTRACT

A two-piece harness retainer is adapted to hold a pair of harness straps in side-by-side relation. A tether is provided to limit pivoting movement of a pivotable latch arm included in one of the pieces included in the harness retainer.

21 Claims, 4 Drawing Sheets

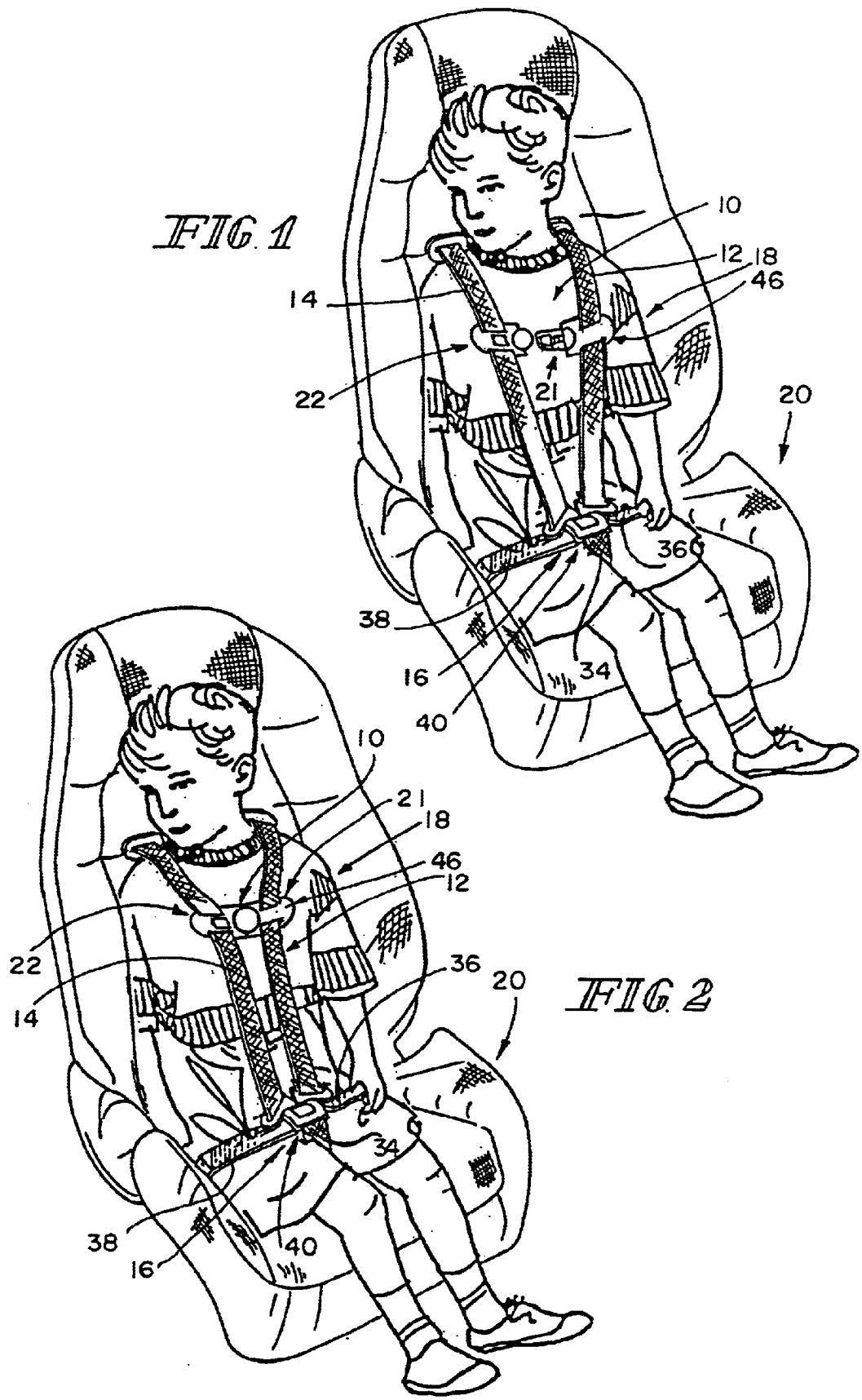

HARNESS RETAINER WITH LIMITED-TRAVEL BUTTON

BACKGROUND AND SUMMARY

The present invention relates to harness retainers and, in particular to a harness retainer for use with a juvenile vehicle seat. More particularly, the present disclosure relates to a snap-together, two-piece harness retainer.

Harness retainers hold shoulder straps together so that straps lie properly on a person wearing a harness assembly including the shoulder straps. Typically, harness assemblies are used to restrain a child seated in a juvenile vehicle seat as a safety precaution.

In accordance with the present disclosure, a two-piece harness retainer includes a latch unit adapted to be coupled to a first shoulder strap in a harness assembly and a latch retainer adapted to be coupled to a second shoulder strap in the harness assembly. A blade in the latch unit is sized to fit into a blade receiver formed in the latch retainer to cause a button in the blade to fit into a button receiver formed in the latch retainer so as to fasten the latch unit to the latch retainers A tether is provided in the blade to limit pivotable movement of a latch arm included in the blade and configured to carry the button.

Additional features of the disclosure will become apparent to those skilled in the art upon consideration of the following detailed description of preferred embodiments exemplifying the best mode of carrying out the disclosure as presently perceived.

BRIEF DESCRIPTION OF THE DRAWINGS

The detailed description particularly refers to the accompanying figures in which:

FIG. 1 is a perspective view of a child seated in a juvenile vehicle seat and restrained in a seat position by a harness assembly and showing a two-piece harness retainer comprising a latch unit coupled to a harness strap running over the child's left shoulder and a latch retainer coupled to a harness strap running over the child's right shoulder before the latch unit is coupled to the latch retainer;

FIG. 2 is a perspective view similar to FIG. 1 showing the latch unit coupled to the latch retainer to hold the left and right shoulder straps in side-by-side relation at a point adjacent to the upper body of the child seated in the juvenile vehicle seat;

DETAILED DESCRIPTION OF THE DRAWINGS

Figure 3:
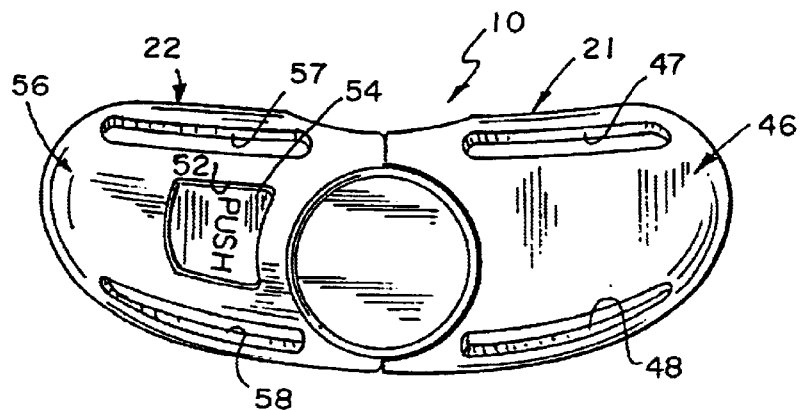
FIG. 3 is an enlarged top plan view of the two-piece harness retainer in the latched position shown in FIG. 1.

As suggested in FIGS. 1 and 2, a two-piece harness retainer 10 is used to hold first and second straps 12, 14 in a harness assembly 16 in side-by-side relation at a point adjacent to the upper body of a child 18 seated in a juvenile vehicle seat 20. Harness retainer 10 includes a latch unit 21 and a latch retainer 22 configured to fasten to latch unit 21 as shown in FIGS. 2 and 3. Latch unit 21 includes a pivotable latch arm 24 that is tethered by tether 26 as shown, for example, in FIGS. 5–7 to limit the range of pivotable movement of latch arm 24 about a pivot axis 28 as shown, for example, in FIG. 8.

As shown, in FIGS. 1 and 2, juvenile vehicle seat 20 includes seat bottom 30 and seat back 32. Illustratively, harness assembly 16 also includes a crotch strap 34, lower straps 36, 38, and a buckle assembly 40. It is within the scope of this disclosure to use two-piece harness retainer 10 with a wide variety of harness assemblies.

Harness retainer 10 includes a latch unit 21 and a separate latch retainer 22. Preferably, each of components 21, 22 is a molded plastic part and adapted for use with a wide variety of harnesses including a child-restraint harness of the type used with juvenile vehicle seats.

Figure 5:
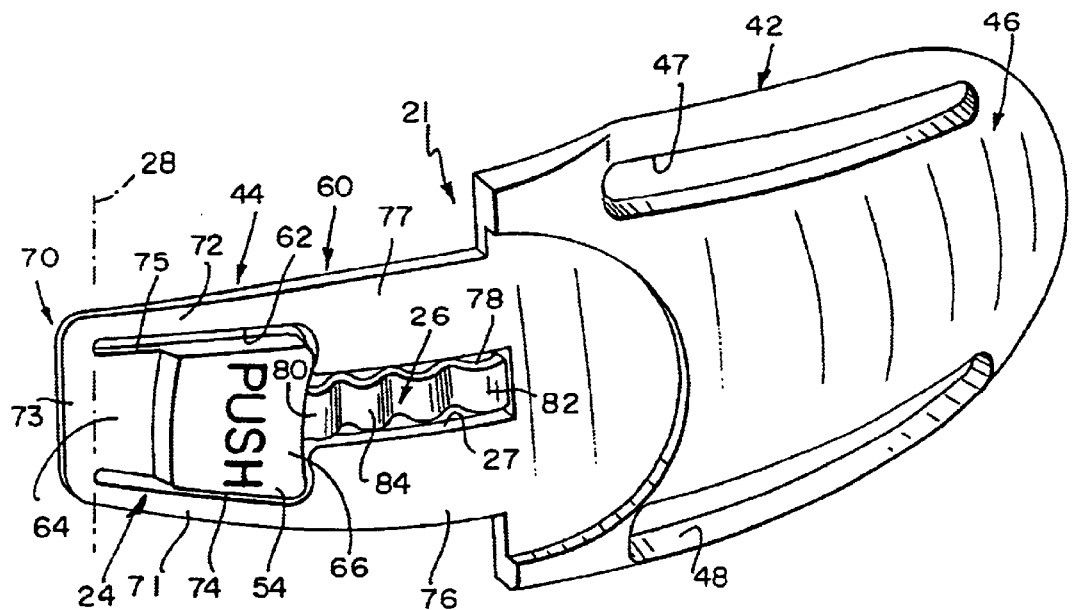
FIG. 5 is an enlarged front perspective view of the latch unit of FIGS. 1–4 showing a base providing a strap mount and a blade appended to the base wherein the blade comprises a latch carrier, a latch arm arranged to pivot relative to the latch carrier during coupling and uncoupling of the latch unit and latch retainer, a latch button coupled to the latch carrier to pivot therewith, and an extensible ribbon coupled to the latch arm and to the base to tether a free end of the latch arm to the base.
Figure 7:
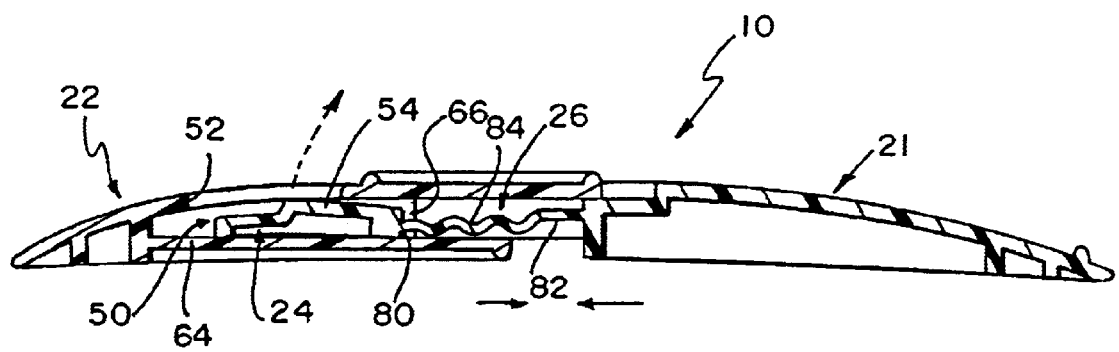
FIG. 7 is a sectional view of the latch unit and latch retainer of FIG. 4 during coupling of the latch unit and the latch retainer showing downward pivoting movement of the tethered latch arm during insertion of the blade into a blade receiver formed in the latch retainer before the latch button carried on the tethered latch arm "arrives" at the button receiver formed in the latch unit and "snaps" upwardly (in the direction of the phantom arrow) to complete coupling of the latch unit to the latch retainer.

Latch unit 21 is shown best in FIGS. 5 and 7 and includes a base 42 and a blade 44 coupled to base 42. Base 42 is formed to include a first strap receiver 46 that is adapted to receive first strap 12 as shown, for example, in FIGS. 1 and 2. In the illustrated embodiment, first strap receiver 46 is defined by a pair of spaced-apart strap-receiving slots 47, 48.

Figure 4:
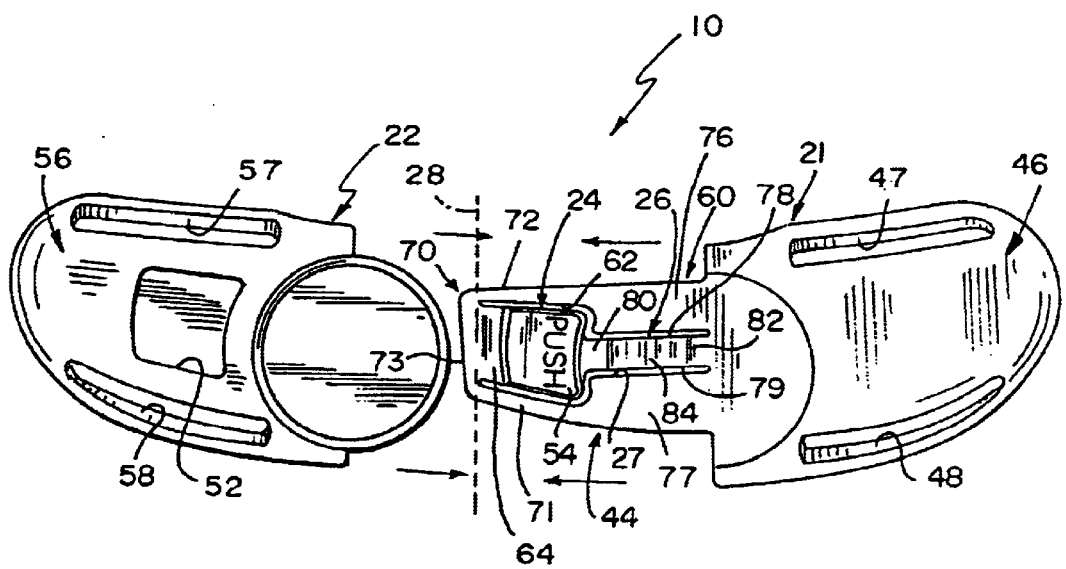
FIG. 4 is a view similar to FIG. 3 showing the two-piece harness retainer in the unlatched position shown in FIG. 2.

Latch retainer 22 is shown in FIGS. 3, 4, and 7 and is formed to include a blade receiver 50 and a button receiver 52 in communication with blade receiver 50. As shown in FIG. 7, blade receiver 50 is formed in latch retainer 22 to receive blade 44 of latch unit 21 when latch unit 21 is coupled to latch retainer 22. Button receiver 52 is formed in latch retainer 22 to receive a button 54 included in blade 44 when blade 44 is inserted fully into blade receiver 50 to couple latch unit 21 to latch retainer 22.

Latch retainer 22 is formed to include a second strap receiver 56 that is adapted to receive second strap 14 as shown, for example, in FIGS. 1 and 2. In the illustrated embodiment, second strap receiver 36 is defined by a pair of spaced-apart strap-receiving slots 57, 58.

Figure 6:
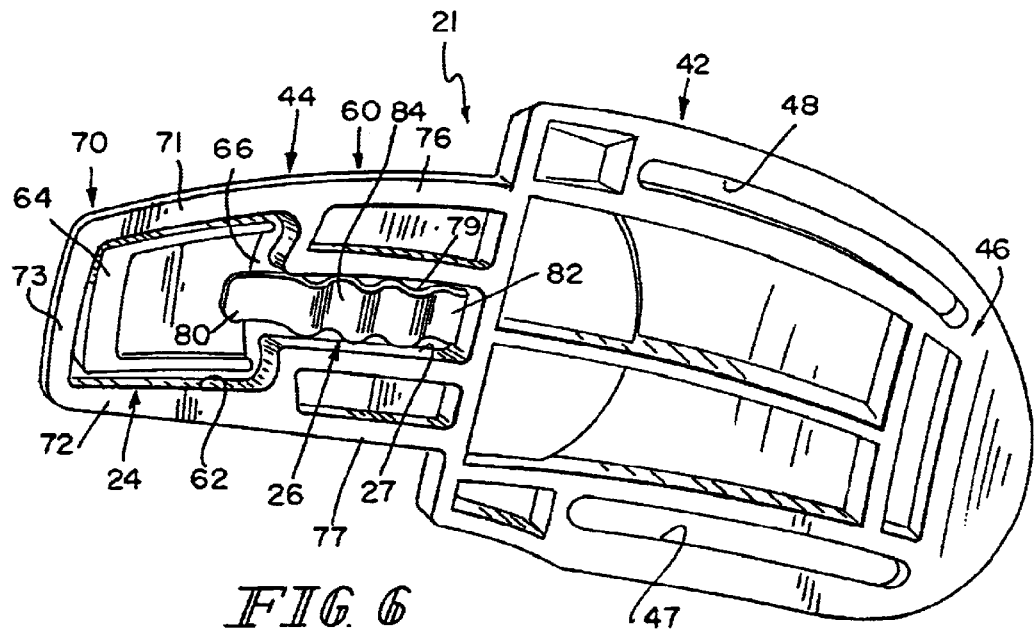
FIG. 6 is a rear perspective view of the latch unit of FIG. 5.

As shown best in FIGS. 4–6, blade 44 includes a latch carrier 60 coupled to base 42 and formed to include a latch-receiving space 62. Blade 44 also includes pivotable latch arm 24, latch button 54, and tether 26. Pivotable latch arm 24 includes root end 64 cantilevered (e.g., as by a "living hinge") to latch carrier 60 to position latch arm 24 for pivotable movement in latch-receiving space 62. Latch arm 24 also includes a free end 66 located in spaced-apart relation to root end 64. Latch button 54 is coupled to latch arm 24 to pivot therewith as suggested in FIG. 8.

Figure 8:
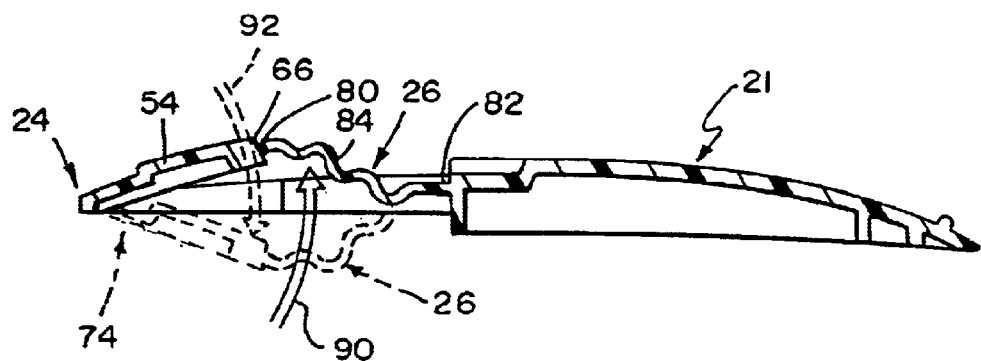
FIG. 8 is an enlarged sectional view of the latch arm and extensible ribbon of FIGS. 5–7 showing extension of the extensible ribbon to limit the range of up and down pivotable movement of the latch arm relative to the latch carrier.

Tether 26 has a first end coupled to free end 66 of latch arm 24 and an opposite second end coupled to another portion of latch unit 21 (e.g., base 42) to limit pivotable movement of latch arm 24 relative to latch carrier 60 as suggested, for example, in FIG. 8. Tether 26 is provided by an elongated, corrugated, extensible ribbon as shown, for example, in FIGS. 5–8.

Latch carrier 60 includes a U-shaped frame 70 having a first leg 71, second leg 72, and cross member 73. First leg 71 lies along a first side 74 of pivotable latch arm 24. Second leg 72 lies along a second side 75 of pivotable latch arm 24. Cross member 73 interconnects first and second legs 71, 72 and supports root end 64 of pivotable latch arm 24.

Latch carrier 60 further includes a first frame support 76 coupled at one end thereof to first leg 71 and at an opposite end thereof to base 42. Latch carrier 60 also includes a second frame support 77 coupled at one end thereof to second leg 72 and at an opposite end thereof to base 42. First and second frame supports 76, 77 are arranged to lie in spaced-apart relation to one another to define a tether channel 27 therebetween. Tether 26 is positioned to lie in tether channel 27 as suggested in FIGS. 4–6. Tether channel 27 is arranged to communicate with latch-receiving space 62.

Tether 26 has a first side edge 78 positioned to lie in confronting and spaced-apart relation to first frame support 76 as suggested in FIGS. 4 and 5. Tether 26 also has a second side edge 79 positioned to lie in confronting and spaced-apart relating to second flame support 77 as suggested in FIGS. 4 and 5. In the illustrated embodiment, tether 26 has a first straight portion 80 coupled to free end 60 of pivotable latch arm 24 and a second straight portion 82 coupled to base 42. Tether 26 also includes a serpentine portion 84 arranged to interconnect first and second straight portions 80, 82 and to extend in a direction perpendicular to laterally extending pivot axis 28. As shown best in FIG. 4, pivotable latch arm 24 and tether 26 cooperate to define a T-shaped member.

Latch arm 24 is coupled to latch carrier 60 to provide means for moving button 54 into button receiver 52 following insertion of blade 44 into blade receiver 50 to retain latch unit 21 in a fixed position relative to latch retainer 22. Tether 26 is configured to provide means for tethering latch arm 24 to limit movement of latch arm 24 relative to latch carrier in an "up" direction 90 and a "down" direction 92 as suggested in FIG. 8.

To disconnect latch retainer 22 from latch unit 21 from the interlocked or latched position shown in FIG. 3, it is necessary only to push latch button 54 to cause latch button 54 to leave button receiver 52 and move into blade receiver 50. Then latch retainer 21 can be moved away to disengage latch retainer 22 to assume the separated position shown in FIG. 4.

What is claimed is:

1. A two-piece harness retainer for holding a pair of harness straps in side-by-side relation, the harness retainer comprising
   a latch unit including a base and a blade coupled to the base, the base being formed to include a first strap receiver adapted to receive a first harness strap, the blade including a latch carrier coupled to the base and formed to include a latch-receiving space, a pivotable latch arm having a root end cantilevered to the latch carrier to position the latch arm for pivotable movement in the latch-receiving space relative to the latch carrier and having a free end located in spaced-apart relation to the root end, a latch button coupled to the pivotable latch arm to pivot therewith, and a tether having a first end coupled to the free end of the pivotable latch arm and an opposite second end coupled to another portion of the latch unit to limit pivotable movement of the pivotable latch arm relative to the latch carrier, and
   a latch retainer including a spaced-apart pair of side walls and a front face located between the side walls, the latch receiver being formed to include a second strap receiver having at least one opening in the front face and adapted to receive a second harness strap, the latch retainer being formed to include a blade receiver located between the side walls and a button receiver having an opening in the front face and lying in communication with the blade receiver, wherein the latch carrier, latch, and tether lie in the blade receiver formed in the latch retainer and the latch button extends into the button receiver opening formed in the front face of the latch retainer to fasten the latch unit to the latch retainer.

2. The harness retainer of claim 1, wherein the front face is formed to include spaced-apart first and second openings into the second strap receiver and the opening into the button receiver is located between the first and second openings.

3. The harness retainer of claim 2, wherein the tether extends in a first direction once the latch unit is fastened to the latch retainer and each of the first and second openings also extend along the front face in the first direction.

4. The harness retainer of claim 1, wherein the tether is arranged to extend along a line in a first direction from the first end to the opposite second end and the pivotable latch arm is arranged to extend along the line in the first direction from the free end to the root end.

5. The harness retainer of claim 1, wherein the tether has a width and the pivotable latch arm has a width that is greater than the width of the tether.

6. The harness retainer of claim 1, wherein the tether is defined by an extensible ribbon having a corrugated serpentine portion therein.

7. The harness retainer of claim 6, wherein the tether has a width and the pivotable latch arm has a width that is greater than the width of the tether.

8. A two-piece harness retainer for holding a pair of harness straps in side-by-side relation, the harness retainer comprising
   a latch unit including a base and a blade coupled to the base, the base being formed to include a first strap receiver adapted to receive a first harness strap, the blade including a latch carrier coupled to the base and formed to include a latch-receiving space, a pivotable latch arm having a root end cantilevered to the latch carrier to position the latch arm for pivotable movement in the latch-receiving space relative to the latch carrier and having a free end located in spaced-apart relation to the root end, a latch button coupled to the pivotable latch arm to pivot therewith, and a tether having a first end coupled to the free end of the pivotable latch arm and an opposite second end coupled to another portion of the latch unit to limit pivotable movement of the pivotable latch arm relative to the latch carrier, and
   a latch retainer formed to include a second strap receiver adapted to receive a second harness strap, the latch retainer being formed to include a blade receiver and a button receiver in communication with the blade receiver, wherein the latch carrier, latch, and tether lie in the blade receiver formed in the latch retainer and the latch button extends into the button receiver formed in the latch retainer to fasten the latch unit to the latch retainer, wherein the latch carrier includes a U-shaped frame having a first leg lying along a first side of the pivotable latch arm, a second leg lying along a second side of the pivotable latch arm, and a cross member interconnecting the first and second legs and supporting the root end of the pivotable latch arm, the latch carrier further includes a first frame support coupled at one end thereof to the first leg and at an opposite end thereof to the base and a second frame support coupled at one end thereof to the second leg and at an opposite end thereof to the base, the first and second frame supports are arranged to lie in spaced-apart relation to one another to define a tether channel therebetween, and the tether is positioned to lie in the tether channel.

9. The harness retainer of claim 8, wherein the second end of the tether is coupled to the base of the latch unit.

10. The harness retainer of claim 8, wherein the tether is an elongated corrugated ribbon.

11. The harness retainer of claim 8, wherein the tether is an extensible ribbon, the extensible ribbon has a first side edge positioned to lie in confronting and spaced-apart relation to the first frame support, and the extensible ribbon has a second side edge positioned to lie in confronting and spaced-apart relation to the second frame support.

12. A two-piece harness retainer for holding a pair of harness straps in side-by-side relation, the harness retainer comprising
a latch unit including a base formed to include a first strap receiver adapted to receive a first harness strap and a blade coupled to the base and formed to include an aperture therein, and
a latch retainer formed to include a second strap receiver adapted to receive a second harness strap, the latch retainer being formed to include a blade receiver and a button receiver in communication with the blade receiver, the blade includes a latch carrier, latch means coupled to the latch carrier for moving a button into the button receiver following insertion of the blade into the blade receiver to retain the latch unit in a fixed position relative to the latch retainer, and means for tethering the latch means to limit movement of the latch means relative to the latch carrier, the latch means and the tether means being located in the aperture formed in the blade.

13. The harness retainer of claim 12, wherein the means for tethering the latch means is coupled to the base.

14. The harness retainer of claim 12, wherein the blade is formed to include a tether channel located in a portion of the aperture between the base and the latch means and the means for tethering the latch means is located in the tether channel.

15. The harness retainer of claim 12, wherein the means for tethering the latch means is an elongated corrugated ribbon.

16. A two-piece harness retainer for holding a pair of harness straps in side-by-side relation, the harness retainer comprising
a latch unit including a base and a blade coupled to the base, the base being formed to include a first strap receiver adapted to receive a first harness strap, the blade including a latch carrier coupled to the base and formed to include a latch-receiving space, a pivotable latch arm having a root end cantilevered to the latch carrier to position the latch arm for pivotable movement in the latch-receiving space relative to the latch carrier and having a free end located in spaced-apart relation to the root end, a latch button coupled to the pivotable latch arm to pivot therewith, and a tether having a first end coupled to the free end of the pivotable latch arm and an opposite second end coupled to another portion of the latch unit to limit pivotable movement of the pivotable latch arm relative to the latch carrier, and
a latch retainer formed to include a second strap receiver adapted to receive a second harness strap, the latch retainer being formed to include a blade receiver and a button receiver in communication with the blade receiver, wherein the latch carrier, latch, and tether lie in the blade receiver formed in the latch retainer and the latch button extends into the button receiver formed in the latch retainer to fasten the latch unit to the latch retainer, wherein the pivotable latch arm is arranged to pivot about a laterally extending pivot axis during movement of the latch button into and out of the button receiver formed in the latch retainer and the tether is an extensible ribbon having a first straight portion coupled to a distal tip of the free end of the pivotable latch arm, a second straight portion coupled to the base, and a serpentine portion arranged to interconnect the first and second straight portions and to extend in a direction perpendicular to the laterally extending pivot axis.

17. A two-piece harness retainer for holding a pair of harness straps in side-by-side relation, the harness retainer comprising
a latch unit including a base and a blade coupled to the base, the base being formed to include a first strap receiver adapted to receive a first harness strap, the blade including a latch carrier coupled to the base and formed to include a latch-receiving space, a pivotable latch arm having a root end cantilevered to the latch carrier to position the latch arm for pivotable movement in the latch-receiving space relative to the latch carrier and having a free end located in spaced-apart relation to the root end, a latch button coupled to the pivotable latch arm to pivot therewith, and a tether having a first end coupled to the free end of the pivotable latch arm and an opposite second end coupled to another portion of the latch unit to limit pivotable movement of the pivotable latch arm relative to the latch carrier, and
a latch retainer formed to include a second strap receiver adapted to receive a second harness strap, the latch retainer being formed to include a blade receiver and a button receiver in communication with the blade receiver, wherein the latch carrier, latch, and tether lie in the blade receiver formed in the latch retainer and the latch button extends into the button receiver formed in the latch retainer to fasten the latch unit to the latch retainer, wherein the tether is defined by an extensible ribbon having a serpentine portion therein.

18. A two-piece harness retainer for holding a pair of harness straps in side-by-side relation, the harness retainer comprising
a latch unit including a base and a blade coupled to the base, the base being formed to include a first strap receiver adapted to receive a first harness strap, the blade including a latch carrier coupled to the base and formed to include a latch-receiving space, a pivotable latch arm having a root end cantilevered to the latch carrier to position the latch arm for pivotable movement in the latch-receiving space relative to the latch carrier and having a free end located in spaced-apart relation to the root end, a latch button coupled to the pivotable latch arm to pivot therewith, and a tether having a first end coupled to the free end of the pivotable latch arm and an opposite second end coupled to another portion of the latch unit to limit pivotable movement of the pivotable latch arm relative to the latch carrier, and a latch retainer formed to include a second strap receiver adapted to receive a second harness strap, the latch retainer being formed to include a blade receiver and a button receiver in communication with the blade receiver, wherein the latch carrier, latch, and tether lie in the blade receiver formed in the latch retainer and the latch button extends into the button receiver formed in the latch retainer to fasten the latch unit to the latch retainer, wherein the pivotable latch arm and the tether cooperate to define a T-shaped member.

19. A two-piece harness retainer for holding a pair of harness straps in side-by-side relation, the harness retainer comprising a latch unit including a base and a blade coupled to the base, the base being formed to include a first strap receiver adapted to receive a first harness strap, the blade including a latch carrier coupled to the base and formed to include a latch-receiving space, a pivotable latch arm having a root end cantilevered to the latch carrier to position the latch arm for pivotable movement in the latch-receiving space relative to the latch carrier and having a free end located in spaced-apart relation to the root end, a latch button coupled to the pivotable latch arm to pivot therewith, and a tether having a first end coupled to the free end of the pivotable latch arm and an opposite second end coupled to another portion of the latch unit to limit pivotable movement of the pivotable latch arm relative to the latch carrier, and a latch retainer formed to include a second strap receiver adapted to receive a second harness strap, the latch retainer being formed to include a blade receiver and a button receiver in communication with the blade receiver, wherein the latch carrier, latch, and tether lie in the blade receiver formed in the latch retainer and the latch button extends into the button receiver formed in the latch retainer to fasten the latch unit to the latch retainer, wherein the tether is arranged to lie in a space defined by two opposing side walls included in the base.

20. A two-piece harness retainer for holding a pair of harness straps in side-by-side relation, the harness retainer comprising a latch unit including a base formed to include a first strap receiver adapted to receive a first harness strap and a blade coupled to the base, and a latch retainer formed to include a second strap receiver adapted to receive a second harness strap, the latch retainer being formed to include a blade receiver and a button receiver in communication with the blade receiver, the blade includes a latch carrier, latch means coupled to the latch carrier for moving a button into the button receiver following insertion of the blade into the blade receiver to retain the latch unit in a fixed position relative to the latch retainer, and means for tethering the latch means to limit movement of the latch means relative to the latch carrier, wherein the means for tethering the latch means is defined by an extensible ribbon having a serpentine portion therein.

21. A two-piece harness retainer for holding a pair of harness straps in side-by-side relation, the harness retainer comprising a latch unit including a base and a blade coupled to the base, the base being formed to include a first strap receiver adapted to receive a first harness strap, the blade including a latch carrier coupled to the base and formed to include a latch-receiving space, the latch carrier including a cross member extending in a first direction, a pivotable latch arm having a root end cantilevered to the cross member of the latch carrier to position the latch arm for pivotable movement in the latch-receiving space relative to the latch carrier about a pivot axis extending in the first direction and having a free end located in spaced-apart relation to the root end, a latch button coupled to the pivotable latch arm to pivot therewith, and a tether extending in a second direction perpendicular to the first direction and having a first end coupled to the free end of the pivotable latch arm and an opposite second end coupled to another portion of the latch unit to limit pivotable movement of the pivotable latch arm relative to the latch carrier, the pivotable latch arm being positioned to lie in the latch-receiving space between the cross member and the tether, and a latch retainer formed to include a second strap receiver adapted to receive a second harness strap, the latch retainer being formed to include a blade receiver and a button receiver in communication with the blade receiver, wherein the latch carrier, latch, and tether lie in the blade receiver formed in the latch retainer and the latch button extends into the button receiver formed in the latch retainer to fasten the latch unit to the latch retainer.

* * * * *